US008260484B2

(12) United States Patent
Yoshikawa

(10) Patent No.: US 8,260,484 B2
(45) Date of Patent: Sep. 4, 2012

(54) DATA UPDATE PROCESSING METHOD AND VEHICLE OPERATION CONTROL DEVICE

(75) Inventor: Hiroshi Yoshikawa, Saitama (JP)

(73) Assignee: Bosch Corporation, Tokyo (JP)

( * ) Notice: Subject to any disclaimer, the term of this patent is extended or adjusted under 35 U.S.C. 154(b) by 282 days.

(21) Appl. No.: 12/672,184

(22) PCT Filed: Aug. 6, 2008

(86) PCT No.: PCT/JP2008/064115

§ 371 (c)(1), (2), (4) Date: Feb. 4, 2010

(87) PCT Pub. No.: WO2009/020149

PCT Pub. Date: Feb. 12, 2009

(65) Prior Publication Data

US 2011/0224867 A1 Sep. 15, 2011

(30) Foreign Application Priority Data

Aug. 9, 2007 (JP) ................................ 2007-207542

(51) Int. Cl.
*G06F 19/00* (2011.01)

(52) U.S. Cl. ................ 701/24; 701/58; 701/59; 701/98; 701/102; 701/449; 706/4; 706/900; 60/285; 60/446; 60/448; 600/485; 492/30; 492/35

(58) Field of Classification Search .................... 701/35, 701/24, 104, 58, 59, 77, 98, 102, 106, 31.4, 701/449, 450; 706/4, 600; 600/485, 494, 600/500; 60/285, 446, 448; 492/35, 30
See application file for complete search history.

(56) References Cited

U.S. PATENT DOCUMENTS

| | | | | |
|---|---|---|---|---|
| 6,038,267 | A * | 3/2000 | Oura et al. | 375/329 |
| 6,836,710 | B2 * | 12/2004 | Yamaki | 701/31.8 |
| 7,677,092 | B2 * | 3/2010 | Ishizuka et al. | 73/114.45 |
| 7,848,868 | B2 * | 12/2010 | Nakagawa et al. | 701/99 |
| 7,921,707 | B2 * | 4/2011 | Ishizuka et al. | 73/114.74 |
| 2004/0015288 | A1 | 1/2004 | Wolber et al. | |
| 2010/0168989 | A1 * | 7/2010 | Gao et al. | 701/110 |

FOREIGN PATENT DOCUMENTS

| | | | |
|---|---|---|---|
| JP | 2852059 | B2 | 1/1999 |
| JP | 2004508487 | A | 3/2004 |
| JP | 2005344614 | A | 12/2005 |
| JP | 3849357 | B2 | 11/2006 |

* cited by examiner

*Primary Examiner* — James Trammell
*Assistant Examiner* — McDieunel Marc
(74) *Attorney, Agent, or Firm* — Michael Best & Friedrich LLP

(57) ABSTRACT

To perform updating of maximum values and minimum values of measurement data with a simple procedure without incurring an increase in the computational load of an arithmetic processing element such as a microcomputer. When processing is started, a most recent maximum value stored in a nonvolatile storage element is written to a maximum value-use variable Xmax and a positive maximum value is written to a minimum value-use variable Xmin. Each time temperature data is acquired, a value of acquired data Xk and a most recent minimum value Xmin are compared and the smaller value is set as a new minimum value Xmin. Each time updating of this minimum value is repeated a predetermined number of times of processing Ns, the minimum value Xmin at that point in time and the maximum value Xmax are compared and the larger value is set as a new maximum value Xmax.

6 Claims, 6 Drawing Sheets

FIG. 6

| EEPROM | Xmax | Xmin | n | A/D | N |
|---|---|---|---|---|---|
| 30 | 30 | ∞ | 0 | - | 1 |
| | | 10 | 1 | 10 | 2 |
| | | 10 | 2 | 20 | 3 |
| | | 10 | 3 | 100 | 4 |
| | | 10 | 4 | 40 | 5 |
| | | 10→∞ | 5→0 | 25 | 6 |
| 30 | 30 | 50 | 1 | 50 | 7 |
| | | 50 | 2 | 60 | 8 |
| | | 50 | 3 | 65 | 9 |
| | | 50 | 4 | 52 | 10 |
| | | 50→∞ | 5→0 | 53 | 11 |
| 50 | 50 | 30 | 1 | 30 | 12 |
| | | 20 | 2 | 20 | 13 |
| | | -100 | 3 | -100 | 14 |
| | | -100 | 4 | 10 | 15 |
| | 50 | -100 | 5→0 | 20 | 16 |

DATA UPDATE PROCESSING METHOD AND VEHICLE OPERATION CONTROL DEVICE

BACKGROUND OF THE INVENTION

1. Field of the Invention

The present invention pertains to a method of updating maximum or minimum values of measurement data of various types of physical quantities resulting from sensors or the like and particularly relates to shortening processing time and curtailing data quantities required for updating.

2. Description of the Related Art

Conventionally, in operation control of automobiles such as, for example, fuel injection control, measurement values of various types of physical quantities, such as engine coolant temperature, fuel temperature and the temperature of a diesel particulate filter (hereinafter called "DPF"), are directly and indirectly used.

Incidentally, in automobiles of recent years, electronic control devices for electronically controlling the operation thereof are installed, and there are many electronic control devices configured such that not only operation control for vehicle travel is performed, but also, when some kind of problem arises in the vehicle operation, operation analysis thereof is performed.

For example, sometimes electronic control devices are configured such that, in regard to the engine coolant temperature, the fuel temperature and the DPF temperature discussed above, judgment processing of whether or not abnormal overheating had occurred in the past at respective temperature measurement places is executed by the electronic control device as one operation analysis. For that reason, electronic control devices are configured such that, in regard to these temperatures, for example, at each predetermined period, a maximum temperature within that period is acquired, the electronic control device compares that maximum temperature with a maximum temperature that has been acquired most recently, and when that maximum temperature exceeds the maximum temperature that has been acquired most recently, that maximum temperature is stored in a nonvolatile storage element or the like as a new maximum temperature, so that when the electronic control device executes operation analysis, those stored data are used in judgment processing.

When an electronic control device periodically updates and stores this maximum temperature, a situation where abnormal data caused by a temporary problem in the sensor, such as, for example, a temporary disconnection, a short, or noise, are erroneously used as update values must be avoided as much as possible.

As measures to avoid the acquisition of abnormal data, for example, a technique that uses a so-called mean value of data and a technique that uses a median value of data have conventionally been known as disclosed, for example, in Japanese Paten No. 2,852,059.

Moreover, a technique configured to calculate estimate values of desired physical quantities by arithmetic processing in addition to measurement data and to be able to use those in operation control and the like has been proposed as disclosed, for example, in Japanese Paten No. 3,849,357.

However, in the methods that use a mean value or a median value of measurement values, there are the problems that a large quantity of past data are required, so a large storage area for saving data, or in other words a large-capacity storage element, is required, which not only incurs an increase in the cost of the device but also requires more time for data processing, incurs an increase in the computational load of a microcomputer that performs arithmetic processing, and can affect the processing capability of operation control overall.

SUMMARY OF THE INVENTION

The present invention has been made in view of the above-described circumstances and provides a data update processing method that can reliably perform updating of maximum values or minimum values of measurement data with a simple procedure without incurring an increase in the computational load of an arithmetic processing element or an arithmetic processing device such as a microcomputer.

It is another object of the present invention to provide a vehicle operation control device that can reliably perform updating of maximum values or minimum values of temperature data with a simple configuration without incurring an increase in the computational load of an arithmetic processing element such as a microcomputer.

According to a first aspect of the present invention, there is provided a data update processing method for updating maximum values of data each time predetermined pieces of data is acquired, the maximum value update processing repeats comparing, each time data are acquired, a value of that acquired data and a most recent minimum value and setting the smaller value as a new minimum value, and, each time updating of this minimum value is repeated the predetermined number, comparing the minimum value and the maximum value at that point in time and setting the larger value as a new maximum value, to perform maximum value updating.

According to a second aspect of the present invention, there is provided a data update processing method for updating minimum values of data each time predetermined pieces of data is acquired, the minimum value update processing repeats comparing, each time data are acquired, a value of that acquired data and a most recent maximum value and setting the larger value as a new maximum value, and, each time updating of this maximum value is repeated the predetermined number, comparing the minimum value at that point in time and the maximum value and setting the smaller value as a new minimum value, to perform minimum value updating.

According to a third aspect of the present invention, there is provided a vehicle operation control device equipped with an electronic control unit configured such that it can sequentially update a maximum value of acquired temperature data, store that update value in a nonvolatile storage element, and supply that stored maximum value for operation control of a vehicle as needed, wherein the electronic control unit is configured to compare, each time temperature data are acquired, a value of the acquired temperature data and a minimum value of most recent temperature data and set the smaller value as a new minimum value, and, each time updating of this minimum value is repeated a predetermined number, compare the minimum value at that point in time and the maximum value, set the larger value as a new maximum value and write the new maximum value in the nonvolatile storage element.

BRIEF DESCRIPTION OF THE DRAWINGS

FIG. 6 is a chart showing specific numerical value examples of updating of maximum values resulting from the data update processing of the embodiment of the present invention.

DETAILED DESCRIPTION OF THE PREFERRED EMBODIMENTS

An embodiment of the present invention will be described below with reference to FIG. 1 to FIG. 6.

It will be noted that the members and arrangements described below are not intended to limit the present invention and can be variously modified within the scope of the gist of the present invention.

First, one configural example of a device to which a maximum value/minimum value update processing method of the embodiment of the present invention is applied will be described with reference to FIG. 1.

Figure 1:
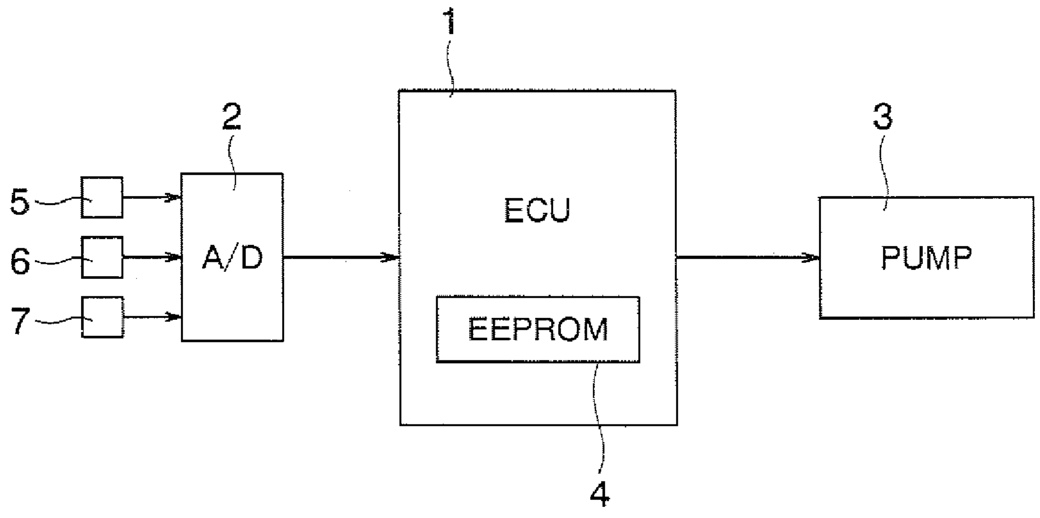
FIG. 1 is a configural diagram showing one configural example of a vehicle operation control device to which a data update processing method of an embodiment of the present invention is applied.

The device shown in FIG. 1 is one configural example of a vehicle operation control device and in particular generally shows parts relating to engine coolant temperature, fuel temperature and the temperature of a diesel particulate filter (hereinafter called "DPF") to which data update processing of the embodiment of the present invention is applied and whose maximum values are updated.

That is, the vehicle operation control device in FIG. 1 is configured to include an electronic control unit (written as "ECU" in FIG. 1) 1 and an analog/digital converter (written as "A/D" in FIG. 1) 2 that converts output signals of various types of analog sensors and the like into digital signals, and operation control of a vehicle, such as the fuel injection timing of a fuel injection pump 3, is executed by the electronic control unit 1.

The electronic control unit 1 is equipped with a microcomputer (not shown) having, for example, a publicly-known/well-known configuration, volatile storage elements (not shown) such as a RAM and a ROM, and a nonvolatile storage element (written as "EEPROM" in FIG. 1) 4 represented by an EEPROM, and the electronic control unit 1 is configured using an input interface circuit (not shown) and an output interface circuit (not shown) as main components.

The output signals of the various types of analog sensors are inputted to the electronic control unit 1 via the analog/digital converter 2 for operation control and failure analysis of the fuel injection pump 3.

In the vehicle operation control device in the configural example of FIG. 1, of the variously disposed sensors, engine coolant temperature, fuel temperature and DPF temperature can be cited as temperatures suited for using a later-discussed data update processing method to perform maximum value updating. Additionally, in the configural example of FIG. 1, a coolant temperature sensor 5 that detects the engine coolant temperature, a fuel temperature sensor 6 that detects the fuel temperature and a DPF temperature sensor 7 that detects the temperature of a DPF (not shown) are shown as representatives of the variously disposed sensors, and output signals of these are inputted via the analog/digital converter 2.

Figure 2:
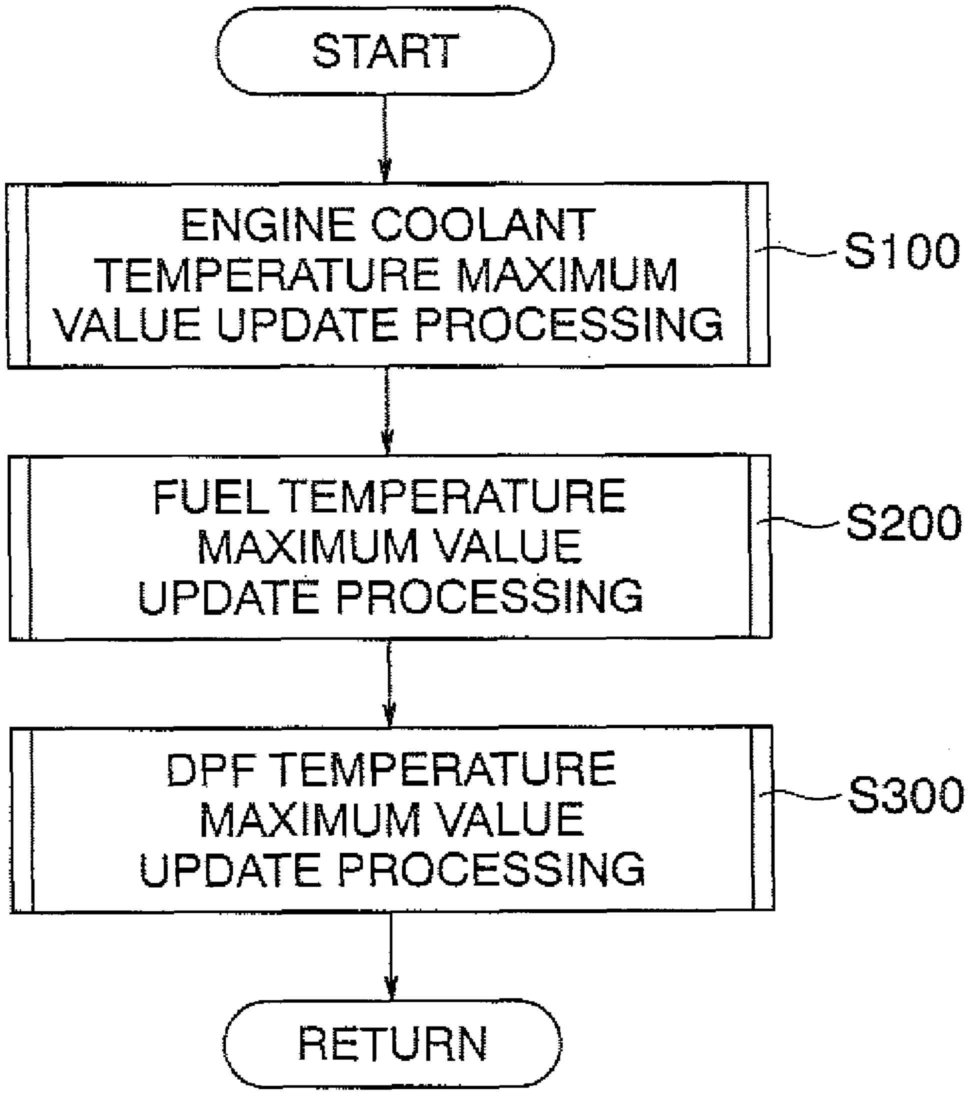
FIG. 2 is a sub-routine flowchart showing an overall procedure of temperature update processing that is executed in an electronic control unit of the vehicle operation control device shown in FIG. 1.

In FIG. 2, there is shown a flowchart showing an overall procedure of data update processing that is executed in the electronic control unit 1, and the procedure of this data update processing will be described below with reference to the same drawing.

When processing is started, first, update processing of a maximum value of the engine coolant temperature is performed (see step S100 in FIG. 2). Then, next, update processing of a maximum value of the fuel temperature is performed (see step S200 in FIG. 2), and, next, update processing of a maximum value of the DPF temperature is performed (see step S300 in FIG. 2).

It will be noted that the order in which each of the aforementioned temperatures is updated is only one example and is naturally not limited to the order discussed above.

Update processing of all of these maximum values is configured such that later-discussed data update processing is respectively executed and respective maximum values are rewritten at predetermined periods in storage areas respectively ensured within the nonvolatile storage element 4.

It will be noted that, after the processing of step S300, the flow returns to an unillustrated main routine, and when, for example, failure analysis processing is executed, maximum values are updated by the update processing discussed above such that the maximum values stored in the nonvolatile storage element 4 are adequately used.

Figure 3:
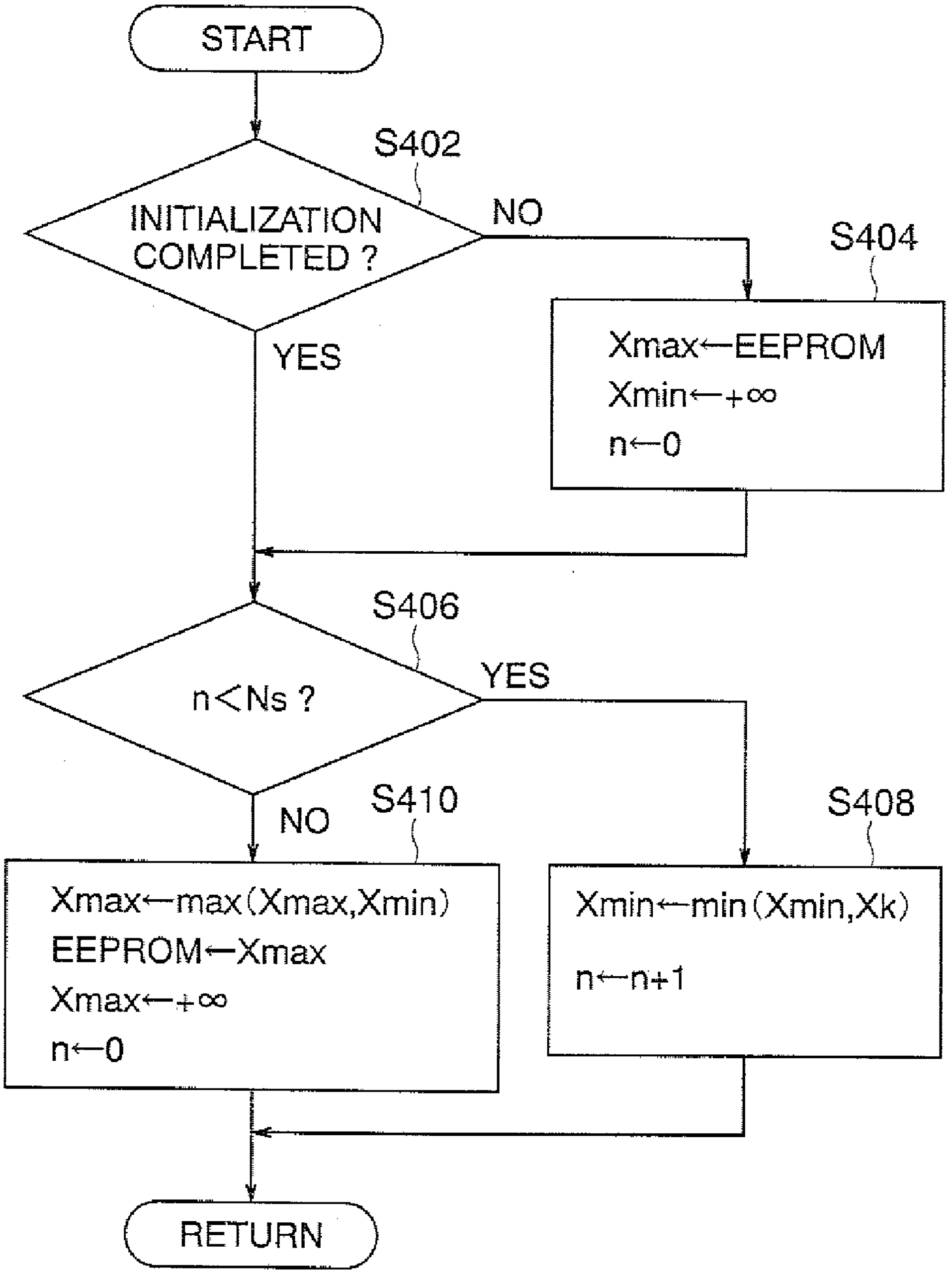
FIG. 3 is a sub-routine flowchart showing a maximum value update procedure resulting from the data update processing of the embodiment of the present invention.

In FIG. 3, there is shown a sub-routine flowchart showing a procedure of data update processing of the embodiment of the present invention, and that processing procedure will be described below with reference to the same drawing.

The data update processing procedure shown in FIG. 3 is particularly for updating maximum values.

To describe this specifically below, when processing is started, first, it is determined whether or not initialization has been completed (see step S402 in FIG. 3). That is, when the series of processing is started, it is determined whether or not a variable or the like has been set to a predetermined initial value, and when it is determined that initialization has not been completed (in the case of NO), the flow proceeds to the processing of next-discussed step S404, and when it is determined that initialization has been completed (in the case of YES), the flow proceeds to the processing of later-discussed step S406.

In step S404, a maximum value of most recent temperature data stored in the nonvolatile storage element 4 is written to a maximum value-use variable Xmax, a positive maximum value is written to a minimum value-use variable Xmin, and a number-of-times-of-processing-use variable n is initialized to zero.

Here, in FIG. 3, the nonvolatile storage element 4 is conveniently written as "EEPROM". Further, the maximum value stored in the nonvolatile storage element 4 specifically is the maximum value of the engine coolant temperature that has been stored most recently when the series of processing shown in FIG. 3 is used in the engine coolant temperature maximum value update processing described before (see step S100 in FIG. 2), the maximum value stored in the nonvolatile storage element 4 is the maximum value of the fuel temperature that has been stored most recently when the series of processing shown in FIG. 3 is used in the fuel temperature maximum value update processing (see step S200 in FIG. 2), and the maximum value stored in the nonvolatile storage element 4 is the maximum value of the DPF temperature that has been stored most recently when the series of processing shown in FIG. 3 is used in the DPF temperature maximum value update processing (see step S300 in FIG. 2).

Further, in step S404, a positive infinity is written as the positive maximum value to the minimum value-use variable Xmin, but in actuality, a maximum numerical value that is written in a register (not shown) within the electronic control unit 1 that is used in order to temporarily store data of the minimum value-use variable Xmin is written. That is, assuming that the register has a total 8-bit capacity, the writable maximum numerical value becomes $2^8-1=255$.

Next, in step S406, it is determined whether or not a value of the number-of-times-of-processing-use variable n is below a predetermined number of times of processing Ns, and when it is determined that the value of the number-of-times-of-processing-use variable n is below the predetermined number of times of processing Ns (in the case of YES), it is still necessary to continue to execute processing, so a measurement value Xk of the temperature being acquired at this point in time and the value of the minimum value-use variable Xmin are compared, and the smaller value is written to the minimum value-use variable Xmin and is set as a new variable value. Further, at the same time, the sum of "1" and the number-of-times-of-processing-use variable n at this point in time is set as a new value of the number-of-times-of-processing-use variable n.

Here, the predetermined number of times of processing Ns corresponds to the number of measurement values that are taken in until updating of the maximum value is performed, but it is not necessary for the predetermined number of times of processing Ns to be limited to a particular value; basically, the predetermined number of times of processing Ns can be arbitrarily set, but it is preferable to consider the speed at which the physical quantity that becomes the target of updating changes.

That is, for example, when temperature data are the target, it is not necessary for the value of the predetermined number of times of processing Ns to be set to that large of a numerical value when the temperature change is relatively gradual, but when temperature data that change from moment to moment within a comparatively short amount of time are the target, it is preferable to set the value of Ns to a relatively large numerical value. It will be noted that whatever value specifically is suitable will variously differ depending on the speed at which the target physical quantity changes, the precision of the update value that is needed, and frequency of updating, so it is preferable to determine the value by experiments and simulations based on those specific numerical values.

After the processing of step S408, the flow returns to the main routine and, after other necessary processing, the series of processing discussed above is again repeated. It will be noted that, in the embodiment of the present invention, the main routine is any of the engine coolant temperature maximum value update processing (step S100 in FIG. 2), the fuel temperature maximum value update processing (see step S200 in FIG. 2) and the DPF temperature maximum value update processing (see step S300 in FIG. 2) to which this series of processing is applied.

In step S410, in correspondence to it having been determined that the value of the number-of-times-of-processing-use variable n is not below the predetermined number of times of processing Ns, in order to end the series of update processing, the value of the maximum value-use variable Xmax at this point in time and the value of the minimum value-use variable Xmin are compared and the value whose numerical value is larger is written to the maximum value-use variable Xmax, whereby maximum value updating is performed. Further, at the same time, the new value of the maximum value-use variable Xmax is written in a predetermined area in the nonvolatile storage element 4, the value of the minimum value-use variable Xmin is again set to the minimum value, the number-of-times-of-processing-use variable n is initialized to zero, the series of processing is ended, and the flow returns to the corresponding main routine as mentioned before.

Figure 5:
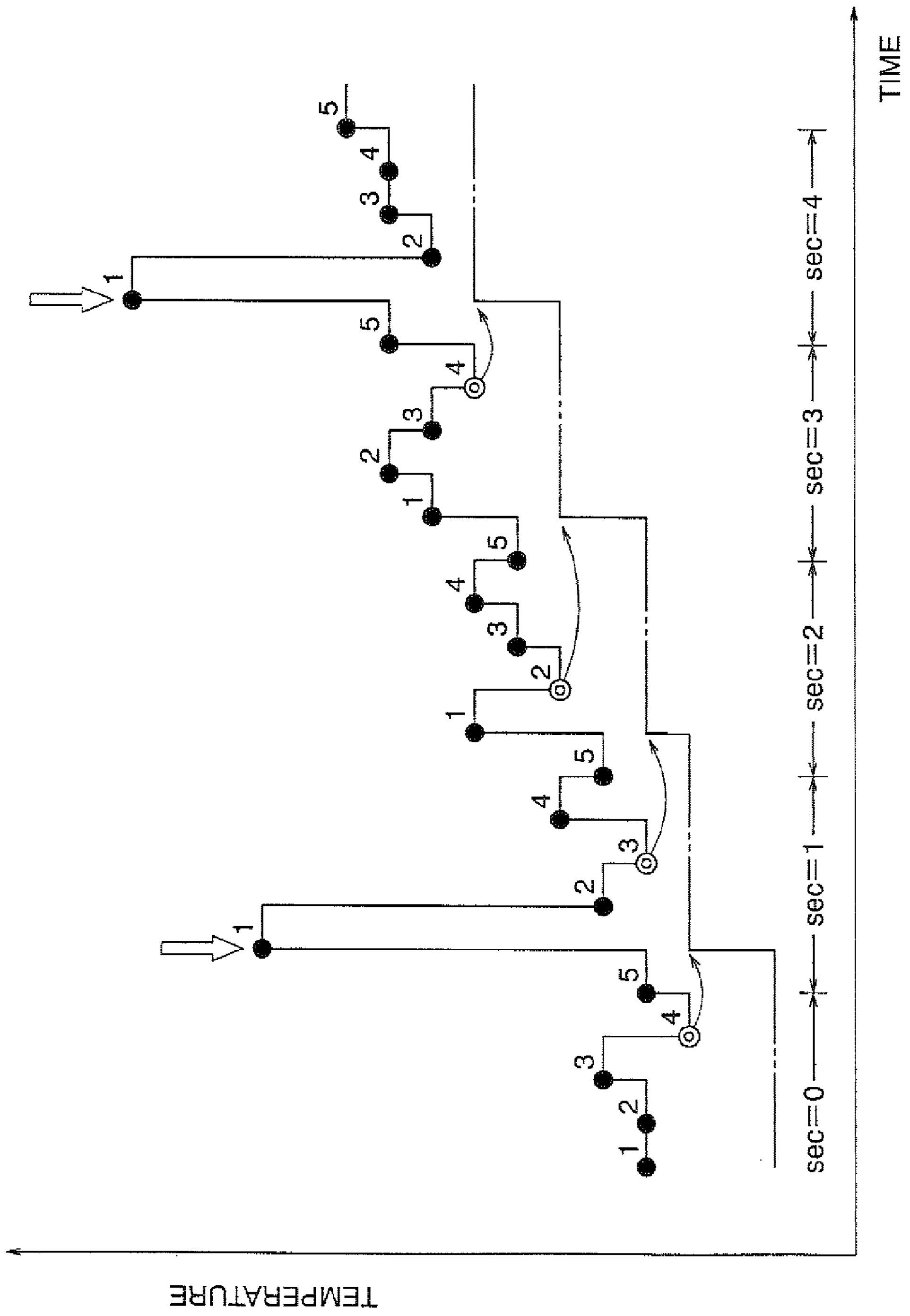
FIG. 5 is a schematic diagram schematically showing updating of maximum values resulting from the data update processing of the embodiment of the present invention.

In FIG. 5, there is schematically shown updating of maximum values of temperature data when the predetermined number of times of processing Ns is 5, and maximum value updating in the example shown in the same drawing will be described below.

First, in FIG. 5, the black dots and the double-circle dots respectively represent temperature data that have been acquired, and the numerical values next to those dots represent the order in which the temperature data have been acquired. Further, in the same drawing, the two-dotted chain line represents changes in the update value of the maximum value.

Under this presupposition, first, in section sec=0 in the same drawing, the temperature data represented by the double-circle dot to which "4" has been added is a minimum value in that section and is set as a maximum value of the temperature data at the point in time when this section sec=0 ends (see the two-dotted chain line in FIG. 5). It will be noted that, in this case, when executing step S410 in FIG. 3, it is presupposed that the value of the maximum value-use variable Xmax or in other words the value that is written to Xmax from the nonvolatile storage element 4 in step S404, is small in comparison to the value of the temperature at the dot to which "4" has been added in section sec=0.

Next, in section sec=1, the temperature data represented by the double-circle dot to which "3" has been added is a minimum value in that section and is set as a maximum value of the temperature data at the point in time when this section sec=1 ends (see the two-dotted chain line in FIG. 5).

Thereafter, in the same manner, the minimum value of the temperature data in each section of sec=2 to sec=4 is set as the maximum value of the temperature data, whereby maximum value updating is performed.

In this manner, by performing maximum value data updating on the basis of the data update processing method of the embodiment of the present invention, a situation where abnormal values that stand out such as indicated by the white arrows in FIG. 5 and whose cause may be considered to be noise or the like are updated as maximum values becomes reliably prevented.

In FIG. 6, in specific numerical value examples, there are shown, in a chart, specific numerical value examples obtained by executing the data update processing shown in FIG. 3, and these specific examples will be described below with reference to the same drawing and FIG. 3.

First, in FIG. 6, "EEPROM" means the nonvolatile storage element 4 and "A/D" means the analog/digital converter 2. Further, "N" means the number of times of processing in total. It will be noted that, in FIG. 6, "Xmax", "Xmin" and "n" are as has been discussed before in the description of FIG. 3.

Further, in the case of this example, the predetermined number of times of processing Ns described in FIG. 3 is 5.

Additionally, it will be assumed that a maximum value 30 is stored and saved in the nonvolatile storage element 4 at the point in time when processing starts.

Under this presupposition, when processing is started, the "30" that is stored and saved in the nonvolatile storage element 4 is written to the maximum value-use variable Xmax, a positive maximum value is written to the minimum value-use variable Xmin, and 0 is written to the number-of-times-of-processing-use variable n (see step S404 in FIG. 3 and column N=1 in FIG. 6).

Next, at the point in time when N=2, for example, "10" is inputted as a measurement value Xk to the electronic control unit 1 via the analog/digital converter 2 as the engine cooling water value temperature detected by the coolant temperature sensor 5. At this point in time, n is less than Ns (see step S406 in FIG. 3), so the smaller value of Xmin=∞ and Xk=10, that is, "10", is written to the minimum value-use variable Xmin, and n is increased by 1 such that n=1 (see column N=2 in FIG. 6).

Next, at the point in time when N=3, assuming that Xk=20 has been inputted, n is still less than Ns (see step S406 in FIG. 3), so the smaller value of Xmin=10 and Xk=20 is selected as Xmin, and, as a result, in this case Xmin=10 is maintained as is.

Next, at the point in time when N=4, assuming that Xk=100 has been inputted, n is still less than Ns (see step S406 in FIG. 3), so the smaller value of Xmin=10 and Xk=100 is selected as Xmin, and, as a result, Xmin=10 is maintained as is in the same manner as previously.

Moreover, at the point in time when N=5, assuming that Xk=40 has been inputted, n is still less than Ns (see step S406 in FIG. 3), so Xmin=10 is, as the smaller value of Xmin=10 and Xk=40, maintained as is in the same manner as previously.

Then, at the point in time when N=6, n<Ns is not established, so Xmax=30 and Xmin=10 are compared, the larger value of these, that is, "30", is written anew as Xmax in the nonvolatile storage element 4, Xmin=00 is set and n=0 is set (see step S410 in FIG. 3).

Then, the same processing is again repeated (see column N=7 to 11 in FIG. 6). In this example, in section N=7 to 11, the maximum value of the measurement values Xk is 50 and Xmax=30, so when these sections end, "50" is selected as the value of Xmax and is written in the nonvolatile storage element 4 as a new value of Xmax by the processing of step S410 shown in FIG. 3.

Next, in section N=12 to 16, the processing shown in FIG. 3 is repeatedly performed. In this section, a negative value "−100" is inputted just once as Xk (see column N=14 in FIG. 6).

Then, when this section ends, the processing of step S410 shown in FIG. 3 is executed, whereby the larger value of Xmax=50 and Xmin=−100, that is, "50", is selected and is written anew as the value of Xmax in the nonvolatile storage element 4 (see column N=16 in FIG. 6).

In this manner, in the data update processing method of the embodiment of the present invention, regardless of whether the data are positive or negative, even when abnormal values of the measurement values Xk such as at N=4 and N=14 in FIG. 6, for example, caused by noise or the like, for example, occur, a situation where these abnormal values are updated as maximum values can be reliably prevented.

The data update processing method discussed above is particularly suited for updating maximum values, but it can also be applied to updating minimum values by basically the same procedure by reversing the relationship between the maximum values and the minimum values in FIG. 3.

Figure 4:
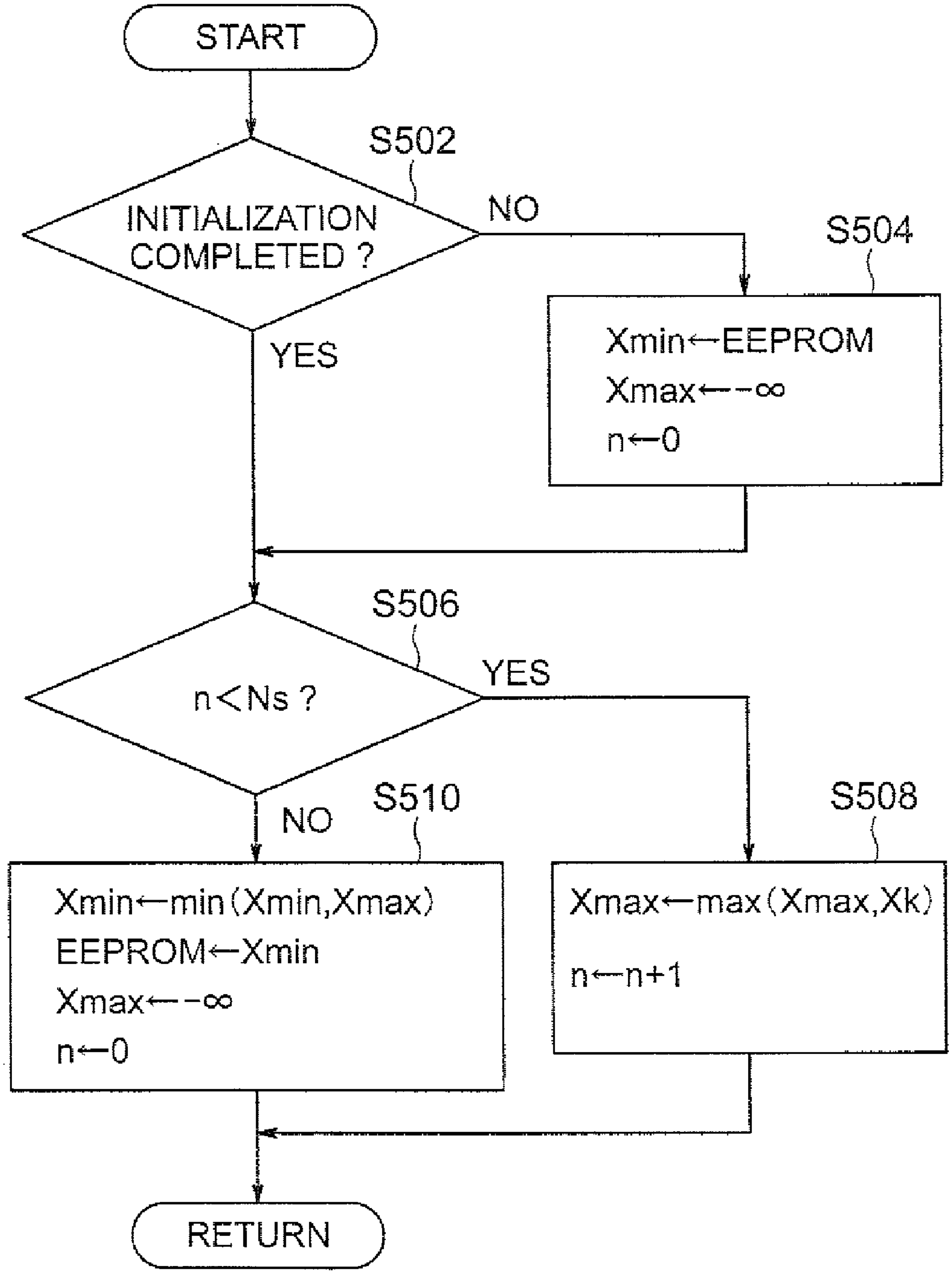
FIG. 4 is a sub-routine flowchart showing a minimum value update procedure resulting from the data update processing of the embodiment of the present invention.

In FIG. 4, there is shown a data update processing procedure suited for updating minimum values, and the minimum value update procedure will be described below with reference to the same drawing. It will be noted that content that is the same as that of the processing procedure shown in FIG. 3 will be appropriately kept to general description and that redundant detailed description will be omitted.

First, it is determined whether or not initialization has been completed (see step S502 in FIG. 4), and when it is determined that initialization has not been completed (in the case of NO), the flow proceeds to the processing of next-discussed step S504, and when it is determined that initialization has been completed (in the case of YES), the flow proceeds to the processing of later-discussed step S506.

It will be noted that this initialization is as has been described in step S402 in FIG. 3, so redundant detailed description here will be omitted.

In step S504, a minimum value of the most recent temperature data stored in the nonvolatile storage element 4 is written to the minimum value-use variable Xmin, a negative maximum value is written to the maximum value-use variable Xmax, and the number-of-times-of-processing-use variable n is initialized to zero.

Here, in FIG. 4, the nonvolatile storage element 4 is conveniently written as "EEPROM". Further, as for the maximum value stored in the nonvolatile storage element 4, basically the same as what has been described before in S404 in FIG. 3, there is written a value where a negative sign has been added to the maximum numerical value that can be written in the register (not shown) within the electronic control unit 1 that is used in order to temporarily store the data of the maximum value-use variable Xmax.

Next, in step S506, it is determined whether or not the value of the number-of-times-of-processing-use variable n is below the predetermined number of times of processing Ns, and when it is determined that the value of the number-of-times-of-processing-use variable n is below the predetermined number of times of processing Ns (in the case of YES), it is still necessary to continue to execute updating of the maximum values, so a measurement value Xk of the temperature being acquired at this point in time and the value of the maximum value-use variable Xmax are compared, and the larger value is written to the maximum value-use variable Xmax. Further, at the same time, the sum of "1" and the number-of-times-of-processing-use variable n at this point in time is set as a new value of the number-of-times-of-processing-use variable n.

After the processing of step S508, the flow returns to the main routine and, after other necessary processing, the aforementioned series of processing is again repeated. It will be noted that, in the embodiment of the present invention, the main routine is any of the engine coolant temperature maximum value update processing (step S100 in FIG. 2), the fuel temperature maximum value update processing (see step S200 in FIG. 2) and the DPF temperature maximum value update processing (see step S300 in FIG. 2) to which this series of processing is applied.

In step S510, in correspondence to it having been determined that the number-of-times-of-processing-use variable n is not below the predetermined number of times of processing Ns, in order to end the series of update processing, the value of the minimum value-use variable Xmin at this point in time and the value of the maximum value-use variable Xmax are compared and the value whose numerical value is smaller is written to the minimum value-use variable Xmin, whereby minimum value updating is performed. Further, at the same time, the new value of the minimum value-use variable Xmin is written in a predetermined area in the nonvolatile storage element 4, a negative maximum value is written to the maximum value-use variable Xmax, the number-of-times-of-processing-use variable n is initialized to zero, the series of processing is ended, and the flow returns to the corresponding main routine as mentioned before.

It will be noted that, in the embodiment discussed above, the electronic control unit 1 has been described as being configured to be capable of implementing just one of either updating maximum values by the data update processing shown in FIG. 3 or updating minimum values by the data update processing shown in FIG. 4, but the electronic control unit 1 may also be configured such that it can use a so-called flag to selectively execute either one as desired.

That is, for example, a processing selection-use flag for selecting updating maximum values or updating minimum values may be disposed, so that the electronic control unit 1 executes maximum value update processing by the data update processing shown in FIG. 3 when the value of that flag is set to "1" and executes minimum value update processing by the data update processing shown in FIG. 4 when the value of that flag is set to "0".

The invention can execute data update processing while maintaining high reliability without increasing the load in an arithmetic element, so the invention can be applied to vehicle operation control devices and the like where update processing of various types of data is required.

According to the present invention, the processing procedure is simple, so the invention achieves the effects that update processing whose reliability is high is reliably performed without increasing the computational load in an arithmetic element and without taking in as update values abnormal data caused by noise or the like, and therefore the invention can contribute to improving the reliability of device operation.

What is claimed is:

1. A data update processing method for updating by a processor maximum values of data each time predetermined pieces of data is acquired, the maximum value update processing repeats comparing, each time data is acquired, a value of that acquired data and a most recent minimum value and setting the smaller value as a new minimum value, and, each time updating of this minimum value is repeated a predetermined number of times, comparing the minimum value and the maximum value at that point in time and setting the larger value as a new maximum value, to perform maximum value updating.

2. A data update processing method for updating by a processor minimum values of data each time predetermined pieces of data is acquired, the minimum value update processing repeats comparing, each time data is acquired, a value of that acquired data and a most recent maximum value and setting the larger value as a new maximum value, and, each time updating of this maximum value is repeated a predetermined number of times, comparing the minimum value and the maximum value at that point in time and setting the smaller value as a new minimum value, to perform minimum value updating.

3. A data update processing method, comprising a processor that performs updating of minimum values or maximum values of data, wherein the method enables selection of either updating of maximum values or updating of minimum values by the processor depending on a numerical value that has been set in a processing selection-use flag, the method performs maximum value update processing when updating of maximum values has been selected by the processing selection-use flag and performs minimum value update processing when updating of minimum values has been selected by the processing selection-use flag, the maximum value update processing repeats comparing by the processor, each time data is acquired, a value of that acquired data and a most recent minimum value and setting the smaller value as a new minimum value, and, each time updating of this minimum value is repeated a predetermined number of times, comparing the minimum value and the maximum value at that point in time and setting the larger value as a new maximum value, to thereby perform maximum value updating, and the minimum value update processing repeats comparing by the processor, each time data is acquired, a value of that acquired data and a most recent maximum value and setting the larger value as a new maximum value, and, each time updating of this maximum value is repeated a predetermined number of times, comparing the minimum value and the maximum value at that point in time and setting the smaller value as a new minimum value, to thereby perform minimum value updating.

4. A data update processing program that is executed in an electronic control unit configured such that the control unit can sequentially update a maximum value of acquired data, store that update value in a nonvolatile storage element and supply that stored maximum value for operation control as needed, the program comprising the steps of:

determining by a processor whether or not initialization has been completed;

when, in the step of determining by the processor whether or not initialization has been completed, the program determines that initialization has not been completed, writing the maximum value stored in the nonvolatile storage element to a maximum value-use variable, writing a predetermined positive maximum value to a minimum value-use variable and initializing a number-of-times-of-processing-use variable to zero;

when, in the step of determining by the processor whether or not initialization has been completed, the program determines that initialization has been completed, determining whether or not a value of the number-of-times-of-processing-use variable is below a predetermined number of times of processing;

when, in the step of determining by the processor the value of the number-of-times-of-processing-use variable, the program determines that the value of the number-of-times-of-processing-use variable is below the predetermined number of times of processing, comparing the value of the acquired data at that point in time and the value of the minimum value-use variable, setting the smaller value as a new value of the minimum value-use variable, and incrementing the value of the number-of-times-of-processing-use variable by 1; and when, in the step of determining by the processor the value of the number-of-times-of-processing use variable, the program determines that the value of the number-of-times-of-processing-use variable is not below the predetermined number of times of processing, comparing the value of the maximum value-use variable at that point in time and the value of the minimum value-use variable, setting the larger value as a new value of the maximum value-use variable, writing the value of that maximum value-use variable in the nonvolatile storage element, writing a predetermined positive maximum value to the minimum value-use variable, and initializing the number-of-times-of-processing-use variable to zero, wherein the program repeatedly executes each step until, in the step of determining by the processor whether or not the value of the number-of-times-of-processing-use variable is below the predetermined number of times of processing, the program determines at least once that the value of the number-of-times-of-processing-use variable is not below the predetermined number of times of processing, whereby the program enables updating of maximum values.

5. A data update processing program that is executed in an electronic control unit configured such that the control unit can sequentially update a minimum value of acquired data, store that update value in a nonvolatile storage element and supply that stored minimum value for operation control as needed, the program comprising the steps of:

determining by a processor whether or not initialization has been completed;

when, in the step of determining by the processor whether or not initialization has been completed, the program determines that initialization has not been completed, writing the minimum value stored in the nonvolatile storage element to a minimum value-use variable, writing a predetermined negative maximum value to a maximum value-use variable and initializing a number-of-times-of-processing-use variable to zero;

when, in the step of determining by the processor whether or not initialization has been completed, the program determines that initialization has been completed, determining whether or not a value of the number-of-times-of-processing-use variable is below a predetermined number of times of processing;

when, in the step of determining by the processor the value of the number-of-times-of-processing-use variable, the program determines that the value of the number-of-times-of-processing-use variable is below the predetermined number of times of processing, comparing the value of the acquired data at that point in time and the value of the maximum value-use variable, setting the larger value as a new value of the maximum value-use variable, and incrementing the value of the number-of-times-of-processing-use variable by 1; and when, in the step of determining by the processor the value of the number-of-times-of-processing use variable, the program determines that the value of the number-of-times-of-processing-use variable is not below the predetermined number of times of processing, comparing the value of the maximum value-use variable at that point in time and the value of the minimum value-use variable, setting the smaller value as a new value of the minimum value-use variable, writing the value of that minimum value-use variable in the nonvolatile storage element, writing a predetermined negative maximum value to the maximum value-use variable, and initializing the number-of-times-of-processing-use variable to zero, wherein the program repeatedly executes each step until, in the step of determining by the processor whether or not the value of the number-of-times-of-processing-use variable is below the predetermined number of times of processing, the program determines at least once that the value of the number-of-times-of-processing-use variable is not below the predetermined number of times of processing, whereby the program enables updating of minimum values.

6. A vehicle operation control device equipped with an electronic control unit configured such that the control unit can sequentially update a maximum value of acquired temperature data, store that update value in a nonvolatile storage element, and supply that stored maximum value for operation control of a vehicle as needed, wherein the electronic control unit is configured to compare, each time temperature data is acquired, a value of the acquired temperature data and a minimum value of most recent temperature data and set the smaller value as a new minimum value, and, each time updating of this minimum value is repeated a predetermined number of times, compare the minimum value at that point in time and the maximum value, set the larger value as a new maximum value and write the new maximum value in a nonvolatile storage element.

* * * * *